June 15, 1926.
J. McCARTY
1,589,196
GARDEN IMPLEMENT ATTACHMENT
Filed May 21, 1925
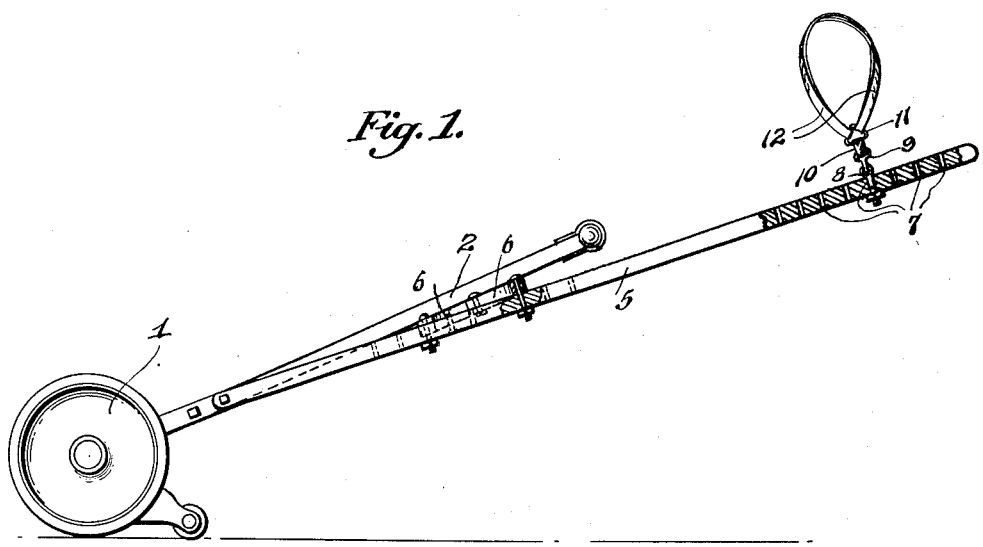
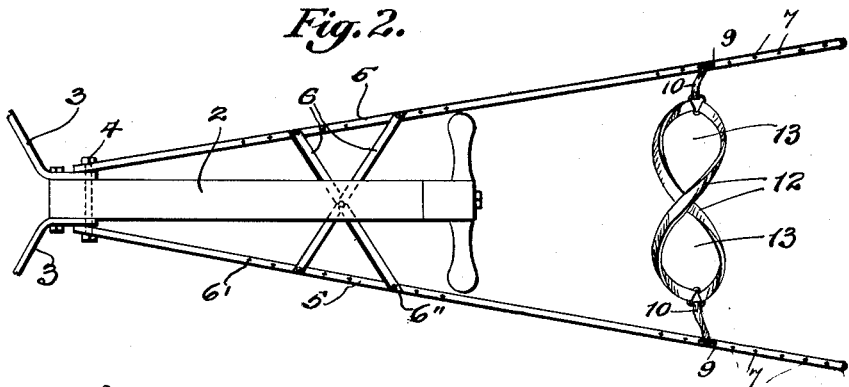
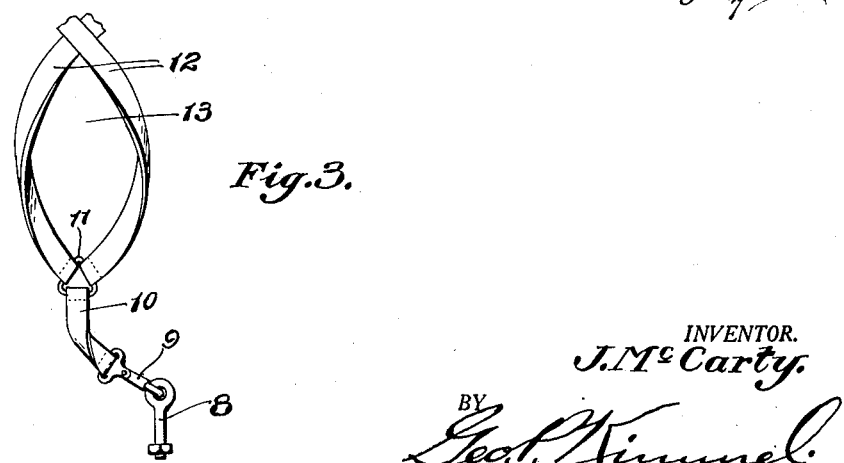
INVENTOR.
J. McCarty.
BY
Geo. F. Kimmel
ATTORNEY.

Patented June 15, 1926.

1,589,196

UNITED STATES PATENT OFFICE.

JAMES McCARTY, OF OSAGE, IOWA.

GARDEN-IMPLEMENT ATTACHMENT.

Application filed May 21, 1925. Serial No. 31,876.

This invention relates to a labor saving device designed to be attached to garden tools such as lawn mowers, and cultivators and any other tools which are manually operated and designed to be forced through or over the ground.

The primary object of this invention is the provision, in a manner as hereinafter set forth, of an implement attachment designed to be suspended from the shoulders of a person using a garden implement to which it is attached so that the strain of pushing and pulling the implement will be transferred chiefly from the hands and arms to the back and shoulders.

The invention contemplates the provision of a frame formed of a pair of relatively long bars which converge at their forward ends and which are adapted to be secured to the handle of the implement to be used. At the rear or diverging ends of the bar there is secured a pair of cross shoulder straps which are removably connected to the bar and are designed to be passed over the shoulders and back of a person using the implement.

A final object of the invention is the provision, in a manner as hereinafter set forth, of a hand operated implement attachment of the character set forth, which will be of light but strong and sturdy construction, easily and quickly applicable to any implement, efficient for the purpose set forth, and inexpensive to set up.

The invention will be best understood from a consideration of the following detailed description taken in connection with the accompanying drawings forming a part of this specification, with the understanding that the invention is not confined to any strict conformity with the showing of the drawing, but may be changed and modified so long as such changes and modifications mark no material departure from the salient features of the invention as expressed in the appended claims.

In the drawings:

Figure 1 is a side elevation of the device embodying this invention showing the same applied to a lawn mower.

Figure 2 is a top plan view of the same and

Figure 3 is an enlarged detail of the shoulder strap showing the method employed for securing the ends of the same to the device, at one side thereof.

Referring now to the drawing in detail wherein like numerals of references indicate corresponding parts throughout the several views, the numeral 1 indicates a lawn mower having the usual rearwardly and upwardly extending handle 2. The lower portion of the handle 2 is usually secured between the ends of two diverging arms 3 by means of bolts 4 and the rear one of these bolts is used in securing the device embodying this invention to the handle of the lawn mower.

The device embodying this invention comprises a pair of relatively long bars 5 secured together by means of the crossed brace members 6. These brace members are arranged forwardly of the central portion of the bars as is shown, and secure the bars in such a manner that the forward ends thereof converge as clearly shown in Figure 2. The forward ends of the bars 5 each have an aperture formed therethrough for the passage of the bolt 4, and when this bolt is passed through the ends to hold the bars in position, the bars are so arranged that the cross connecting members 6 therebetween will be positioned beneath the handle 2 of the implement and will therefore serve to support the handle when the implement is being used.

The bars 5 at the points where the cross members 6 contact are provided with a longitudinally extending series of apertures 6' extending from the top to the underside thereof. Securing bolts 6" are used to retain these members in position and because of the provision of a number of apertures 6' the members can be adjusted longitudinally of the bars to accommodate implements having handles of various lengths.

By this arrangement, upon removing the securing bolts 6", the crossed bars 6 may be manually shifted in a scissors like fashion and in such adjusted position again secured to the members 5, thus rendering the members 5 adjustable relative to each other and increasing or decreasing the space therebetween at their outer end portions. This adapts the device for use by people of either unusually large or small physiques.

The rear ends of the bars 5 are also each supplied with a series of vertically extending apertures 7 through one of which apertures in each bar there is passed the shank of an eye bolt 8. The eyes of these bolts are upon the top faces of the bars 5 and secured in each of the eyes of the bolts is a snap hook 9 to which there is attached a short strap member 10 carrying at its outer end a ring 11.

To these rings 11 there is attached the ends of the pair of shoulder straps 12, which straps cross at their central portion setting up the pair of loops 13 through which the arms of a user of the device are adapted to pass in such a manner that the cross portion of the straps 12 will lie against the back of the user.

The series of apertures 7 in each of the side bars 5 are provided to allow for the adjustment of the strap to persons of different height and reach.

From the foregoing description it can readily be seen that in the use of this attachment in connection with a lawn mower, and cultivator or any other type of implement which, as above stated, is manually operated, the strain of pushing and pulling the implement will be partly relieved from the arms and hands of the user and will be thrown upon the shoulders and back. This device is particularly useful when used in connection with implements such as a lawn mower, which requires to be dragged rearwardly a great deal, for in this direction the arms can be entirely relieved and all of the strain put upon the strongest part of the body, namely the back.

Having thus described the invention, what I claim is:

1. A garden implement attachment of the character described comprising spaced forwardly converging members having spaced grouped series of holes therein, means for detachably fastening the convergent ends of the members to opposite sides of an implement handle and means selectively engageable with the holes of one group to vary the disposition of the members and constituting a rest for said handle, and a body engaging harness adjustably engaged with the holes of the other group thereof for suspending and supporting the attachment from a user's body.

2. A device of the character set forth, comprising a pair of relatively long members converging at their forward ends, means for securing said converging ends one on each side of an implement handle, brace means between said members designed to support said handle, and means carried by and connecting the members at each of their diverging ends for suspending the device from the shoulders of a user.

3. A device of the character set forth, comprising a pair of relatively long bars converging at their forward ends, means for securing said converging ends to the forward part of an implement handle, brace means between said bars designed to support said handle, an eye bolt adjustably secured in each bar adjacent its other end, a short connecting strap secured in the eye of each bolt, and a pair of centrally crossed straps each connected at its ends to the ends of opposite short straps and designed to support the device from the shoulders of a user.

In testimony whereof, I affix my signature hereto.

JAMES McCARTY.